(12) United States Patent
Murakami et al.

(10) Patent No.: US 8,194,204 B2
(45) Date of Patent: Jun. 5, 2012

(54) LIQUID CRYSTAL PANEL AND LIQUID CRYSTAL DISPLAY APPARATUS USING THE SAME

(75) Inventors: Nao Murakami, Ibaraki (JP); Hiroyuki Yoshimi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 127 days.

(21) Appl. No.: 11/914,085

(22) PCT Filed: Apr. 20, 2006

(86) PCT No.: PCT/JP2006/308291
§ 371 (c)(1),
(2), (4) Date: Nov. 9, 2007

(87) PCT Pub. No.: WO2006/120856
PCT Pub. Date: Nov. 16, 2006

(65) Prior Publication Data
US 2009/0091682 A1 Apr. 9, 2009

(30) Foreign Application Priority Data
May 11, 2005 (JP) ................................ 2005-139072

(51) Int. Cl.
*G02F 1/1335* (2006.01)
(52) U.S. Cl. ................. 349/61; 349/62; 349/64; 349/65
(58) Field of Classification Search ....................... 349/65
See application file for complete search history.

(56) References Cited

U.S. PATENT DOCUMENTS

| | | | |
|---|---|---|---|
| 5,796,450 A * | 8/1998 | Kanda et al. | 349/64 |
| 6,281,956 B1 | 8/2001 | Ohmuro et al. | |
| 6,642,981 B1 * | 11/2003 | Ohmuro et al. | 349/120 |
| 6,665,032 B1 * | 12/2003 | Kikkawa | 349/117 |
| 6,974,241 B2 * | 12/2005 | Hara et al. | 362/606 |
| 7,075,609 B2 | 7/2006 | Ohmuro et al. | |
| 7,253,799 B2 * | 8/2007 | Lee et al. | 345/102 |
| 7,356,239 B2 | 4/2008 | Hara et al. | |
| 7,379,140 B2 | 5/2008 | Ohmuro et al. | |
| 7,478,937 B2 | 1/2009 | Hara et al. | |
| 7,548,294 B2 | 6/2009 | Ohmuro et al. | |
| 7,604,388 B2 | 10/2009 | Nishio et al. | |

(Continued)

FOREIGN PATENT DOCUMENTS

JP    5-323289    12/1993

(Continued)

OTHER PUBLICATIONS

Machine translated JP2000-190385A; Jul. 11, 2000.*

(Continued)

*Primary Examiner* — Wen-Ying P Chen
(74) *Attorney, Agent, or Firm* — Westerman, Hattori, Daniels & Adrian, LLP

(57) ABSTRACT

A liquid crystal panel according to the present invention includes a backlight portion emitting light having a brightness distribution in a horizontally oblong oval shape assuming that a longitudinal direction of a panel is a horizontal direction; a first polarizer; a liquid crystal cell; an optical compensation layer having a refractive index profile of nx>ny>nz; and a second polarizer, in this order from a backlight side. According to the present invention, a liquid crystal panel having remarkably excellent contrast in an oblique direction, small light leakage in a black display and a small color shift is provided.

7 Claims, 9 Drawing Sheets

U.S. PATENT DOCUMENTS

| | | |
|---|---|---|
| 7,726,864 B2 | 6/2010 | Hara et al. |
| 7,808,592 B2 | 10/2010 | Ohmuro et al. |
| 2003/0058382 A1* | 3/2003 | Tanoue et al. ............ 349/65 |
| 2004/0130882 A1 | 7/2004 | Hara et al. |
| 2005/0180166 A1 | 8/2005 | Hara et al. |
| 2005/0180719 A1 | 8/2005 | Hara et al. |
| 2005/0180720 A1 | 8/2005 | Hara et al. |
| 2005/0248704 A1 | 11/2005 | Ohmuro et al. |
| 2005/0259193 A1* | 11/2005 | Sumiyoshi et al. ........ 349/62 |
| 2006/0203150 A1 | 9/2006 | Ohmuro et al. |
| 2008/0212339 A1 | 9/2008 | Hara et al. |
| 2008/0239213 A1 | 10/2008 | Ohmuro et al. |
| 2009/0213305 A1 | 8/2009 | Ohmuro et al. |
| 2010/0277678 A1 | 11/2010 | Ohmuro et al. |

FOREIGN PATENT DOCUMENTS

| | | |
|---|---|---|
| JP | 8-114794 | 5/1996 |
| JP | 10-153782 A | 6/1998 |
| JP | 11-095208 | 4/1999 |
| JP | 2000-47208 A | 2/2000 |
| JP | 2000190385 A * | 7/2000 |
| JP | 2002-116444 A | 4/2002 |
| JP | 2002-236297 | 8/2002 |
| JP | 2004-309800 | 11/2004 |
| TW | 523620 B | 3/2003 |
| TW | 200417791 A | 9/2004 |
| WO | 02/08822 A2 | 1/2002 |

OTHER PUBLICATIONS

Chinese Office Action, issued Apr. 14, 2010 for corresponding Chinese Patent Application No. 2006-80016351.5.
Japanese Office Action dated Oct. 6, 2010, issued in corresponding Japanese Patent Application No. 2005-139072.
Taiwanese Office Action dated Nov. 29, 2010, issued in corresponding Taiwanese Patent Application No. 095116311.
Japanese Office Action dated Jan. 12, 2011, issued in corresponding Japanese Patent Application No. 2005-139072.

* cited by examiner

LIQUID CRYSTAL PANEL AND LIQUID CRYSTAL DISPLAY APPARATUS USING THE SAME

TECHNICAL FIELD

The present invention relates to a liquid crystal panel and a liquid crystal display apparatus using the same. More specifically, the present invention relates to a liquid crystal panel having remarkably excellent contrast in an oblique direction, small light leakage in a black display and a small color shift, and a liquid crystal display apparatus using the same.

BACKGROUND ART

FIG. 12(a) shows a schematic sectional view of a conventional liquid crystal display apparatus, and FIG. 12(b) shows a schematic sectional view of a liquid crystal cell used for the liquid crystal display apparatus. A liquid crystal display apparatus 900 is provided with: a liquid crystal cell 910; retardation plates 920 and 920' arranged on outer sides of the liquid crystal cell 910; and polarizing plates 930 and 930' arranged on outer sides of the retardation plates 920 and 920, respectively. The polarizing plates 930 and 9301 are generally arranged such that respective absorption axes thereof are perpendicular to each other. The liquid crystal cell 910 includes: a pair of substrates 911 and 911'; and a liquid crystal layer 912 as a display medium arranged between the substrates. One substrate 911 is provided with: a switching element (typically, TFT) for controlling electrooptic characteristics of liquid crystal; and a scanning line for providing a gate signal to the switching element and a signal line for providing a source signal thereto (the element and the lines not shown). The other substrate 911' is provided with: color layers 913R, 913G, and 913B constituting a color filter; and a light shielding layer (black matrix layer) 914. A space (cell gap) between the substrates 911 and 911' is controlled by a spacer (not shown).

The retardation plates are used for the purpose of optical compensation of the liquid crystal display apparatus. Various attempts have been made at optimization of optical characteristics of the retardation plates and/or at arrangement of the retardation plates in the liquid crystal display apparatus for attaining optimum optical compensation (such as improvement in viewing angle characteristics, improvement in color shift, and improvement in contrast). Conventionally, as shown in FIGS. 12(a) and 12(b), one retardation plate is arranged between the liquid crystal cell 910 and the polarizing plate 930, and another retardation plate is arranged between the liquid crystal cell 910 and the polarizing plate 930' (see Patent Document 1, for example). In order to attain optimum optical compensation with such a structure, the retardation plates disclosed in Patent Document 1 and arranged on both sides of the liquid crystal cell each have a thickness of 140 μm. However, when conventional retardation plates are used in a liquid crystal display apparatus in a conventional arrangement, contrast in an oblique direction often degrades. Meanwhile, further improvement in screen uniformity and display quality is demanded with recent development of a high-definition and high-performance liquid crystal display apparatus. In consideration of such a demand, degradation of contrast in an oblique direction is a critical issue. Further, a demand for reduction in thickness of the liquid crystal display apparatus has increased with the development of a small, portable liquid crystal display apparatus. However, a liquid crystal display apparatus is hardly reduced in thickness if two thick retardation plates are arranged as in the conventional liquid crystal display apparatus.

As described above, there is a strong demand for a liquid crystal display apparatus capable of satisfying requirements with respect to more excellent display quality and thinning.
Patent Document 1: JP 11-95208 A

DISCLOSURE OF THE INVENTION

Problems to be Solved by the Invention

The present invention has been made in order to solve the above-mentioned conventional problems, and it is therefore an object of the invention to provide a liquid crystal panel having remarkably excellent contrast in an oblique direction, small light leakage in a black display and a small color shift, and a liquid crystal display apparatus using the same.

Means for Solving the Problems

A liquid crystal panel according to an embodiment of the invention includes a backlight portion emitting light having a brightness distribution in a horizontally oblong oval shape assuming that a longitudinal direction of a panel is a horizontal direction; a first polarizer; a liquid crystal cell; an optical compensation layer having a refractive index profile of nx>ny>nz; and a second polarizer, in this order from a backlight side.

In one embodiment of the invention, the optical compensation layer has a Nz coefficient of 2<Nz<20. In another embodiment of the invention, the optical compensation layer has a thickness of 1 to 20 μm. In still another embodiment of the invention, the optical compensation layer is composed of a non-liquid crystalline polymer material including at least one selected from the group consisting of polyamide, polyimide, polyester, polyetherketone, polyamideimide, and polyesterimide. In still another embodiment of the invention, a fast axis of the optical compensation layer and an absorption axis of the second polarizer are parallel to each other.

In still another embodiment of the invention, the liquid crystal cell adopts a VA mode or an OCB mode as a drive mode.

According to another aspect of the invention, a liquid crystal display apparatus is provided. The liquid crystal display apparatus includes the above-described liquid crystal panel.

Effects of the Invention

As described above, according to the present invention, by placing an optical compensation layer having specific optical characteristics on a viewer side of a liquid crystal cell, and using such optical compensation layer in combination with a backlight portion that emits light having a brightness distribution in a horizontally oblong oval shape assuming that a panel longitudinal direction is a horizontal direction, a liquid crystal panel having remarkably excellent contrast in an oblique direction, small light leakage in a black display and a small color shift can be obtained. The effect of the present invention is an excellent unexpected finding that has been found only after a liquid crystal panel having the optimized relationship between the characteristics and arrangement of an optical compensation layer and the brightness distribution of a backlight is produced actually.

DESCRIPTION OF REFERENCE NUMERALS

Figure 1:
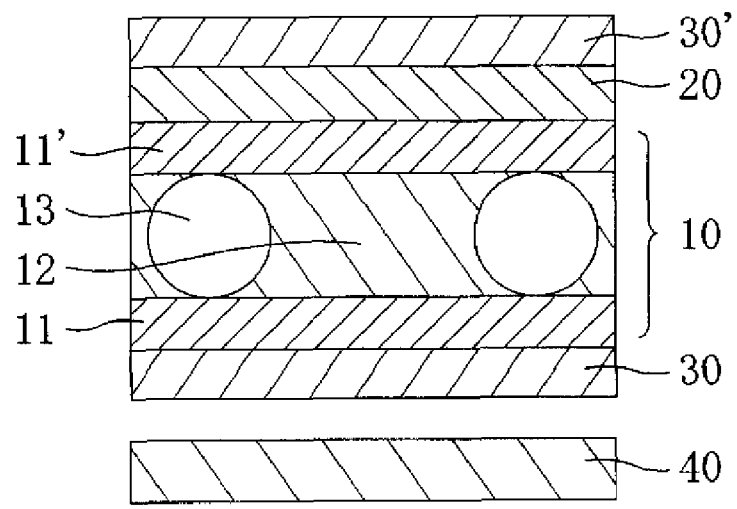
FIG. 1 A schematic cross-sectional view of a liquid crystal panel according to a preferred embodiment of the present invention.

10 Liquid crystal cell
11, 11' Glass substrate
12 Liquid crystal layer
20 Optical compensation layer
30, 30' Polarizer
40 Backlight portion
100 Liquid crystal display apparatus

BEST MODE FOR CARRYING OUT THE INVENTION

A. Liquid Crystal Panel (Liquid Crystal Display Apparatus)

Figure 2:
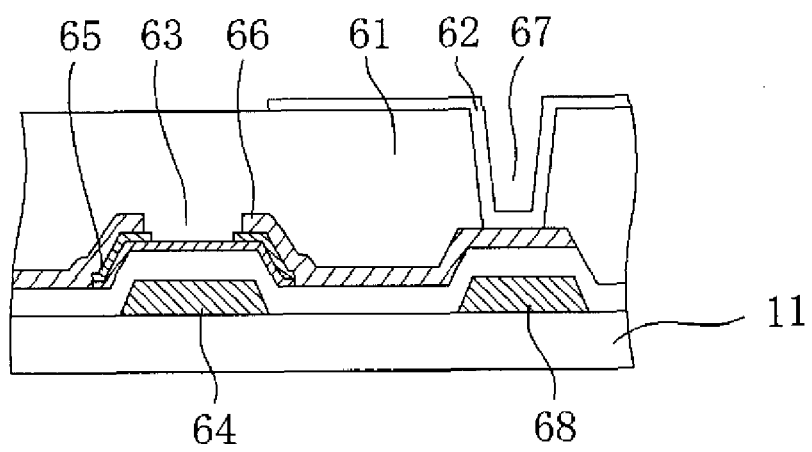
FIG. 2 A schematic cross-sectional view of an active matrix substrate used in the liquid crystal panel of FIG. 1, corresponding to a cross-section taken along the line II-II of FIG. 3.
Figure 3:
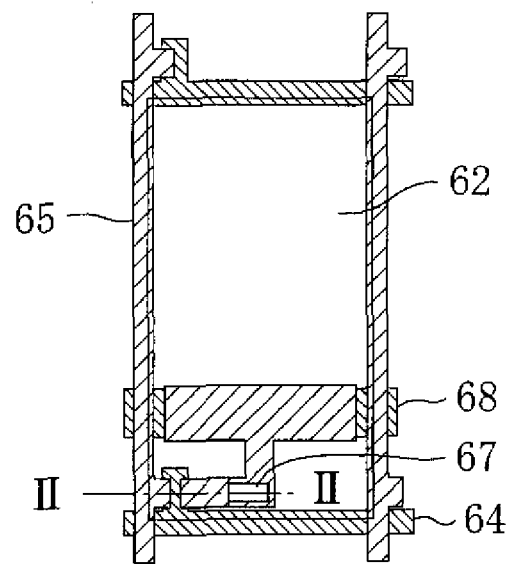
FIG. 3 A schematic plan view of the active matrix substrate of FIG. 2.

FIG. 1 is a schematic sectional view of a liquid crystal display apparatus according to a preferred embodiment of the present invention. FIG. 2 is a schematic sectional view of an active matrix substrate used for the liquid crystal display apparatus. FIG. 3 is a schematic plan view of the active matrix substrate of FIG. 2. FIG. 2 corresponds to a cross-section taken along the line II-II of FIG. 3.

A liquid crystal display apparatus 100 is provided with: a backlight portion 40, a first polarizer 30, a liquid crystal cell 10, an optical compensation layer 20 and a second polarizer 30', in this order from a backlight side. The polarizers 30 and 30' are generally arranged such that absorption axes of the respective polarizers are perpendicular to each other. The liquid crystal cell 10 includes: a pair of substrates (typically, glass substrates) 11 and 11'; and a liquid crystal layer 12 as a display medium arranged between the substrates. One substrate (active matrix substrate) 11 is provided with: a switching element (typically, TFT) for controlling electrooptic characteristics of liquid crystal; and a scanning line for providing a gate signal to the switching element and a signal line for providing a source signal thereto (the element and the lines not shown). The other glass substrate (color filter substrate) 11' is provided with a color filter (not shown). The color filter may be provided on the active matrix substrate 11. A space (cell gap) between the substrates 11 and 11, is controlled by a spacer 13. An alignment film (not shown) formed of, for example, polyimide is provided on a side of each of the substrates 11 and 11' in contact with the liquid crystal layer 12.

In the liquid crystal panel of the present invention, the optical compensation layer 20 is placed only on the viewer side of the liquid crystal cell 10. Further, the optical compensation layer 20 is placed so that a fast axis thereof is substantially parallel to the absorption axis of the second polarizer 30'. By using the optical compensation layer having specific optical characteristics in combination with the backlight portion emitting light having a specific brightness distribution, and placing the optical compensation layer only on the viewer side of the liquid crystal cell, a liquid crystal panel having remarkably excellent contrast in an oblique direction, small light leakage in a black display and a small color shift can be obtained. Such an effect is not theoretically clear, and is a finding that has been obtained only after trial and error are repeated for optimizing the characteristics and arrangement of the backlight portion and the optical compensation layer, which is an unexpected excellent effect. The detail of the backlight portion and the optical compensation layer will be respectively described in sections B and C below.

The active matrix substrate 11 is provided with an interlayer insulating film 61 over an entire surface on a side of the liquid crystal layer 12. The interlayer insulating film 61 is formed through spin coating of a photosensitive acrylic resin, for example. As shown in FIG. 2, a pixel electrode 62 is provided on the interlayer insulating film 61 in a matrix form, and a region provided with the pixel electrode 62 serves as a display portion for displaying an image. The pixel electrode 62 is composed of a transparent conductive material such as indium tin oxide (ITO). The pixel electrode 62 may be formed by: forming a thin film through, for example, sputtering; and patterning the thin film through photolithography and etching. Any suitable TFTs 63 provided in a matrix form, a scanning line 64 for supplying a gate signal to the TFT 63, and a signal line 65 for supplying a source signal (display signal) thereto are provided under the interlayer insulating film 61. The scanning line 64 and the signal line 65 are provided to be perpendicular to each other. The TFT 63 generally includes: a semiconductor layer of amorphous silicon, polysilicon, or the like; and a metal layer of aluminum, molybdenum, chromium, copper, tantalum, or the like. The scanning line 64 and the signal line 65 are each formed of aluminum, molybdenum, copper, or the like. A part of the scanning line 64 constitutes a gate electrode of the TFT 63, and a part of the signal line 65 constitutes a source electrode. One end of a connecting piece is electrically connected to a drain electrode 66 of the TFT 63. The other end of the connecting piece is electrically connected to the pixel electrode 62 via a contact hole 67 penetrating through the interlayer insulating film 61. A parasitic capacity wiring 68 extends below the contact hole 67. Such a structure allows selective application of a voltage to the desired pixel electrode 62.

The color filter substrate 11' is provided with the color filter 13 including color layers for red (R), green (G), and blue (B) divided by a light shielding layer (black matrix layer). The color layers are each formed using an acrylic resin, gelatin, or the like, and are provided at positions corresponding to the pixel electrode 62 in the display portion. The black matrix layer may be formed of a metal, or may be formed of a resin material. A resin material is generally prepared by dispersing a pigment in an acrylic resin.

A drive mode of the liquid crystal cell 10 may employ any suitable drive modes as long as the effects of the present invention can be provided. Specific examples of the drive mode include a super twisted nematic (STN) mode, a twisted nematic (TN) mode, an in-plane switching (IPS) mode, a vertical aligned (VA) mode, an optically compensated birefringence (OCB) mode, a hybrid aligned nematic (HAN) mode, and an axially symmetric aligned microcell (ASM) mode. Of those, a VA mode and an OCB mode are preferred because color shift, light leakage in black display and contrast in an oblique direction are significantly improved by combining a VA mode or OCB mode liquid crystal cell with the optical compensation layer 20 and the backlight portion 40 in the present invention.

Figure 4A:
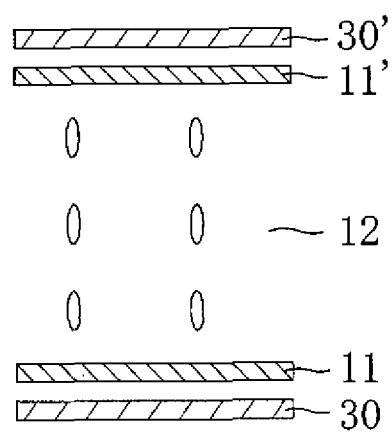
FIGS. 4(a) and 4(b) Schematic cross-sectional views illustrating alignment states of liquid crystal molecules in a liquid crystal layer in the case where the liquid crystal panel of the present invention adopts a liquid crystal cell in a VA mode.
Figure 4B:
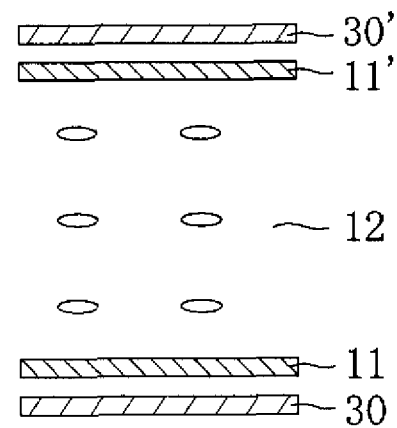

FIGS. 4(a) and 4(b) are each a schematic sectional view illustrating an alignment state of liquid crystal molecules in a VA mode. As shown in FIG. 4(a), liquid crystal molecules are aligned vertically to the substrates 11 and 11' without application of a voltage. Such vertical alignment is realized by arranging nematic liquid crystal having negative dielectric anisotropy between the substrates each having a vertical alignment film formed thereon (not shown). When light (specifically, linear polarized light which passed through the polarizer 30) enters the liquid crystal layer 12 in such a state from a surface of one substrate 11, the incident light advances along a longitudinal direction of the vertically aligned liquid crystal molecules. No birefringence occurs in the longitudinal direction of the liquid crystal molecules, and thus the incident light advances without changing a polarization direction and is absorbed by the polarizer 30' having an absorption axis perpendicular to that of the polarizer 30. In this way, a dark state is displayed without application of a voltage (normally black mode). As shown in FIG. 4(b), longitudinal axes of the liquid crystal molecules align parallel to the substrate surfaces when a voltage is applied between the electrodes. The liquid crystal molecules exhibit birefringence with linear polarized light entering the liquid crystal layer 12 in such a state, and a polarization state of the incident light changes in accordance with inclination of the liquid crystal molecules. Light passing through the liquid crystal layer during application of a predetermined maximum voltage is converted into linear polarized light having a polarization direction rotated by 90°, for example. Thus, the light passes through the polarizer 30', and a bright state is displayed. Upon termination of voltage application, the display is returned to a dark state by an alignment restraining force. An applied voltage is changed to control inclination of the liquid crystal molecules, so as to change an intensity of light transmission from the polarizer 301. As a result, display of gradation can be realized.

Figure 5A:
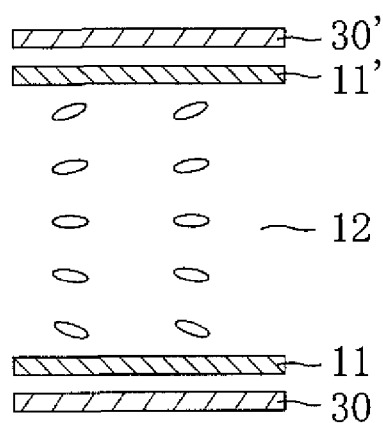
FIGS. 5(a) to 5(d) Schematic cross-sectional views illustrating alignment states of liquid crystal molecules in a liquid crystal layer in the case where the liquid crystal panel of the present invention adopts a liquid crystal cell in an OCB mode.
Figure 5B:
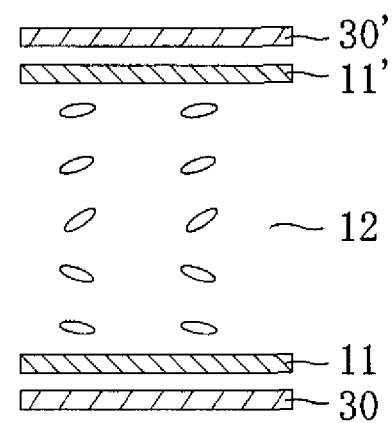
Figure 5C:
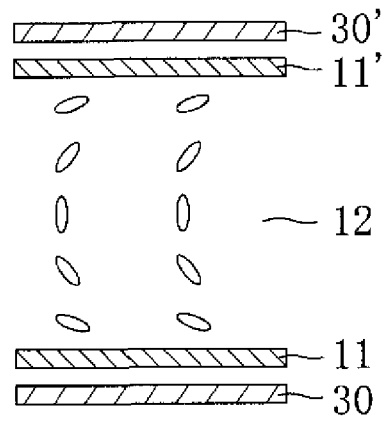
Figure 5D:
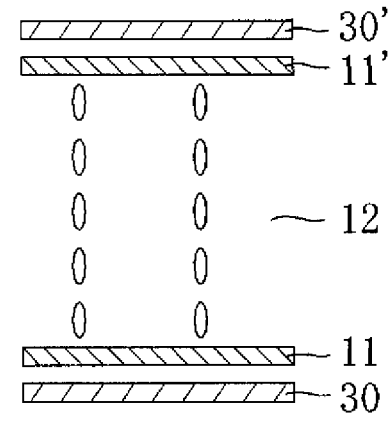

FIGS. 5(a) to 5(d) are each a schematic sectional view illustrating an alignment state of liquid crystal molecules in an OCB mode. The OCB mode is a display mode in which the liquid crystal layer 12 is constituted by so-called bend alignment. As shown in FIG. 5(c), the bend alignment refers to an alignment state wherein: nematic liquid crystal molecules are aligned at a substantially parallel angle (alignment angle) in the vicinity of a substrate; the alignment angle of the liquid crystal molecules becomes vertical to a substrate plane toward the center of the liquid crystal layer; and the alignment angle changes successively and continuously to parallel with a facing substrate surface away from the center of the liquid crystal layer. Further, the bend alignment refers to an alignment state having no twist structure across the entire liquid crystal layer. Such bend alignment is formed as follows. As shown in FIG. 5(a), the liquid crystal molecules have a substantially homogeneous alignment in a state without application of an electric field or the like (initial state). However, the liquid crystal molecules each have a pretilt angle, and a pretilt angle in the vicinity of one substrate is different from a pretilt angle in the vicinity of the opposite substrate. A predetermined bias voltage (generally 1.5 V to 1.9 V) is applied (low voltage application) to the liquid crystal molecules, to thereby realize spray alignment as shown in FIG. 5(b) and then into bend alignment as shown in FIG. 5(c). Then, a display voltage (generally 5 V to 7 V) is applied (high voltage application) to the state of bend alignment, and thus the liquid crystal molecules align/stand substantially vertical to the substrate surface as shown in FIG. 5(d). In a normally white display mode, light entering the liquid crystal layer in a state shown in FIG. 5(d) during high voltage application through the polarizer 30 advances without changing a polarization direction and is absorbed by the polarizer 30', to thereby display a dark state. Upon reduction of a display voltage, the alignment is returned to bend alignment to display a bright state by an alignment restraining force of rubbing treatment. A display voltage is changed to control inclination of the liquid crystal molecules, so as to change an intensity of light transmission from the polarizer. As a result, display of gradation can be realized. The liquid crystal display apparatus provided with an OCB mode liquid crystal cell allows switching of phase transition from a spray alignment state to a bend alignment state at a very high speed, and has excellent dynamic image display characteristics compared to those of a liquid crystal display apparatus provided with a liquid crystal cell of another drive mode such as a TN mode or an IPS mode.

As the display mode of the above-mentioned liquid crystal cell in an OCB mode, either one of a normally white mode that takes a dark state (black display) under the application of high voltage and a normally black mode that takes a bright state (white display) under the application of high voltage can be employed.

The cell gap of the above-mentioned liquid crystal cell in an OCB mode is preferably 2 µm to 10 µm, more preferably 3 µm to 9 µm, and most preferably 4 µm to 8 µm. If the cell gap is in the above range, a response time can be shortened, whereby satisfactory display characteristics can be obtained.

As the nematic liquid crystal used in the above-mentioned liquid crystal cell in an OCB mode, preferably, the nematic liquid crystal having positive dielectric anisotropy is used. Specific examples of the nematic liquid crystal having positive dielectric anisotropy include those described in JP 9-176645 A. Commercially available nematic liquid crystal may be used as it is. Examples of the commercially available nematic liquid crystal include "ZLI-4535" (tradename), "ZLI-1132" (tradename), etc. manufactured by Merck Ltd. The difference between the normal light refractive index (no) and the abnormal light refractive index (ne) of the above-mentioned nematic liquid crystal, i.e., the birefringence ($\Delta n_{LC}$) is appropriately selected depending upon the response rate, transmittance, and the like of the above-mentioned liquid crystal, and preferably 0.05 to 0.30, more preferably 0.10 to 0.30, still more preferably 0.12 to 0.30. Further, the pretilt angle of such a nematic liquid crystal is preferably 1° to 10°, more preferably 2° to 80, and most preferably 30 to 60. If the pretilt angle is in the above range, a response time can be shortened, whereby satisfactory display characteristics can be obtained.

The above-mentioned liquid crystal panel is preferably used in a liquid crystal display apparatus of a personal computer, a liquid crystal television, a mobile telephone, a personal digital assistant (PDA), a projector, or the like.

B. Backlight Portion

Figure 6:
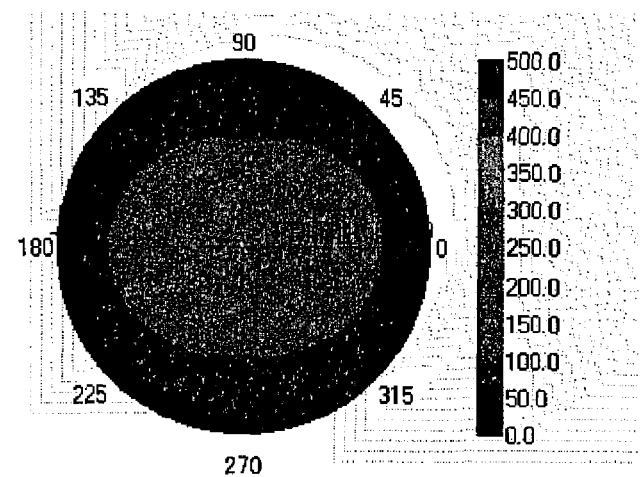
FIG. 6 An omnidirectional brightness contour map showing a brightness distribution of light emitted from a backlight portion in a preferred embodiment of the present invention.
Figure 7:
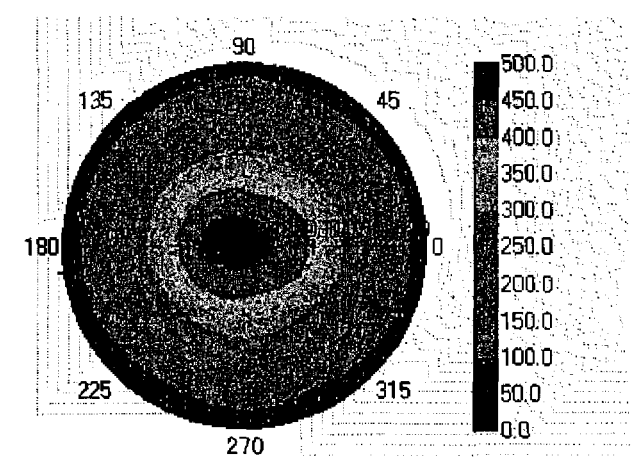
FIG. 7 An omnidirectional brightness contour map showing a brightness distribution of light emitted from a backlight portion in another preferred embodiment of the present invention.

The above-mentioned backlight portion 40 generally includes a light source, and if required, diffusion means (for example, a diffusion layer or a diffusion plate), scattering means (for example, a scattering plate), reflection means (for example, a reflection plate such as an opaque plate), and/or polarizing means. In the present invention, the backlight portion 40 emits light having a brightness distribution in a horizontally oblong oval shape when the longitudinal direction of the panel is arranged in a horizontal direction. The light emitted from the backlight portion may be natural light or polarized light, as long as it has such a brightness distribution. In this specification, the term "brightness distribution in a horizontally oblong oval shape" refers to a brightness distribution in which a polar angle X in a horizontal direction (0°-180° direction) displaying a brightness of a predetermined value or more in an omnidirectional brightness contour map is larger than a polar angle Y in a perpendicular direction (90°-270° direction) displaying a brightness of the predetermined value or more. Examples of such a brightness distribution include a brightness distribution as shown in FIG. 6 or 7. As long as such a brightness distribution is satisfied, even if a backlight portion emitting light having any type of brightness distribution is used, a liquid crystal panel having remarkably excellent contrast in an oblique direction, small light leakage in a black display and a small color shift may be obtained by placing a specific optical compensation layer on a viewer side of a liquid crystal cell.

Figure 8A:
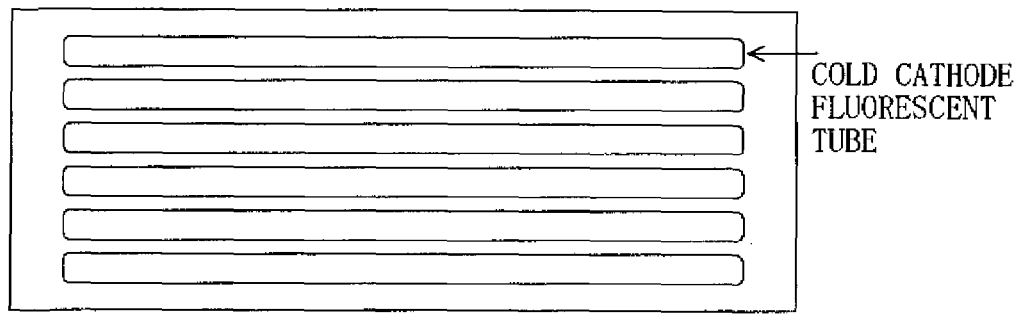
FIG. 8 Part (a) is a schematic plan view showing a structure of a direct-type backlight, part (b) is a schematic plan view showing an exemplary structure of a side-type backlight, and part (c) is a schematic plan view showing another exemplary structure of a side-type backlight.
Figure 8B:
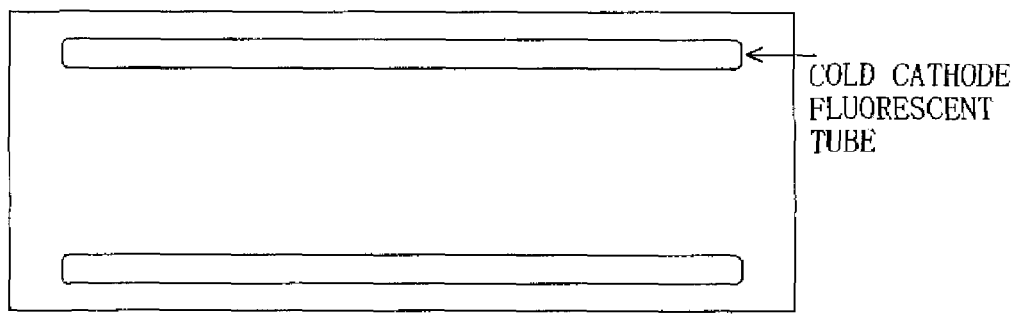
Figure 8C:
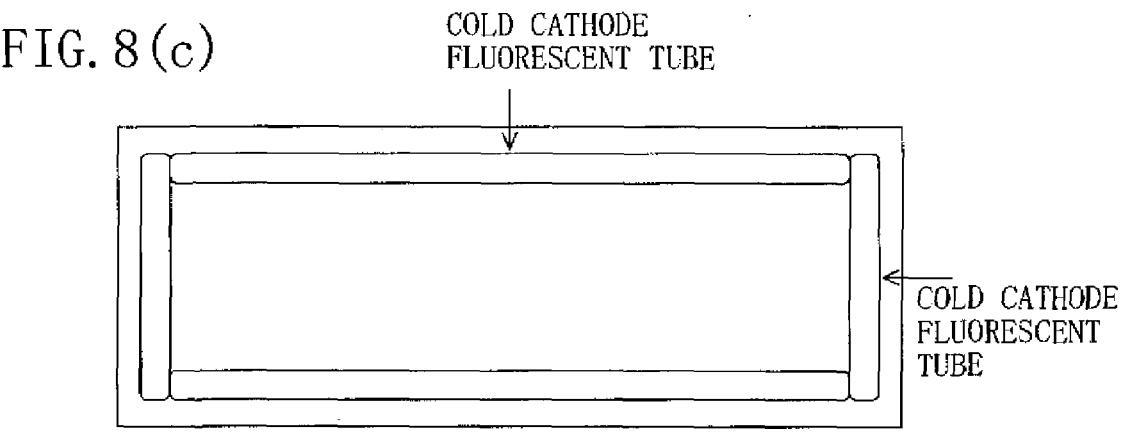

As the light source of the above-mentioned backlight portion, any suitable configuration can be adopted, as long as the light source emits light having a brightness distribution in a horizontally oblong oval shape when the longitudinal direction of the panel is arranged in a horizontal direction. The light source is manufactured generally by combining a dot or linear light source portion with a light diffusing member. Typical examples of the light source include a direct-type backlight and an edge-light type (side-type) backlight of a transmission type liquid crystal display apparatus. FIG. 8(a) is a schematic plan view showing a structure of the direct-type backlight, FIG. 8(b) is a schematic plan view showing an exemplary structure of a side-type backlight, and FIG. 8(c) is a schematic plan view showing another exemplary structure of the side-type backlight. More specifically, the direct-type backlight employs a system in which a plurality of (typically 5 to 12) linear light sources (typically, fluorescent lamps or cold cathode fluorescent tubes) are arranged in the longitudinal direction of the liquid crystal panel, and light is emitted from the entire back surface of the liquid crystal panel. The direct-type backlight is composed of a linear light source, a reflection plate placed at the back of the linear light source, and a light scattering plate (for example, a opaque plate) placed in front of the linear light source. A plurality of linear light sources may be all the same, partially the same and partially different, or all different. In the direct-type backlight, by appropriately setting the type, combination, and/or arrangement of linear light sources, and the structures/structure of the reflection plate and/or the light scattering plate, light can be emitted which has a brightness distribution in a horizontally oblong oval shape when the longitudinal direction of a panel is arranged in a horizontal direction.

The edge-light type backlight is known as a surface light source which is easily thinned compared with the direct-type backlight and has excellent uniformity of brightness. In the edge-light type backlight, linear light sources (typically, fluorescent lamps or cold cathode fluorescent tubes) are placed at ends (for example, both ends of long sides of a liquid crystal panel as shown in FIG. 8(b), or a peripheral portion of the liquid crystal panel as shown in FIG. 8(c)) of a light guide body (for example, a transparent acrylic plate). In the edge-light type backlight, for example, a diffusion layer is formed over the entire surface of a light guide body, so light from a light source can be emitted from a desired surface of the light guide body. The surfaces other than a front surface (light emitting surface) of the light guide body are covered with a reflection plate. In order to make a brightness uniform, for example, the diffusion effect by the diffusion layer is allowed to have a gradient in accordance with the distance from the light source. In order to obtain a sufficient illumination surface brightness, by a procedure of laminating a diffusion plate on a light guide body with the back surface subjected to Fresnel mirror treatment, laminating a light guide body on a prism subjected to Fresnel mirror treatment, or the like, the emitted light is provided with directivity. In the edge-light type (side-type) backlight, by appropriately setting the linear light sources, light guide body, diffusion layer, and/or reflection plate, light can be emitted, which has a brightness distribution in a horizontally oblong oval shape when the longitudinal direction of a panel is arranged in a horizontal direction.

A typical example of the above-mentioned polarizing means includes a linearly polarized light separation film. As the linearly polarized light separation film, any appropriate film that separates linearly polarized light from natural light or polarized light can be adopted. Typical examples of such a linearly polarized light separation film include a grid-type polarizer, a multi-layered thin film laminate of at least two layers made of at least two kinds of materials each having different refractive index profile, a vapor deposition multi-layered thin film in which each layer having different refractive index and which is used in a beam splitter or the like, a birefringence layer multi-layered thin film laminate of at least two layers made of at least two kinds of materials each having refractive index, a stretched resin laminate of at least two layers using at least two kinds of resins each having refractive index, and a film that separates linearly polarized light by reflecting/transmitting it in an perpendicular axial direction. For example, a monoaxially stretched multi-layered laminate can be used, in which a layer of a material expressing a retardation by stretching (for example, polyethylene naphthalate, polyethylene terephthalate, or polycarbonate) or acrylic resin (for example, polymethyl methacrylate), and a layer of a resin expressing a small retardation amount (for example, norbornene-based resin such as Artone manufactured by JSR Co., Ltd.) are laminated alternately. The linearly polarized light separation film is commercially available, for example, as DBEF (tradename) manufactured by 3M Corporation. The thickness of the linearly polarized light separation film that can be used in the present invention is typically about 50 to 200 μm.

C. Optical Compensation Layer

C-1. Optical Characteristics and Entire Configuration of Optical Compensation Layer The in-plane retardation (front retardation) Δnd of the optical compensation layer 20 can be optimized corresponding to the display or drive mode of the liquid crystal cell. For example, the lower limit of Δnd is preferably 5 nm or more, more preferably 10 nm or more, and most preferably 15 nm or more. When Δnd is less than 5 nm, the contrast in an oblique direction decreases in most cases. On the other hand, the upper limit of Δnm is preferably 400 nm or less, more preferably 300 nm or less, still more preferably 200 nm or less, particularly preferably 150 nm or less, more particularly preferably 100 nm or less, and most preferably 80 nm or less. When Δnd exceeds 400 nm, the viewing angle decreases in most cases. More specifically, when the liquid crystal cell adopts a VA mode, Δnd is preferably 5 to 150 nm, more preferably 10 to 100 nm, and most preferably 15 to 80 nm. When the liquid crystal cell adopts an OCB mode, Δnd is preferably 5 to 400 nm, more preferably 10 to 300 nm, and most preferably 15 to 200 nm. Δnd is obtained by an expression: Δnd=(nx−ny)×d. Herein, nx is a refractive index in a slow axis direction of the optical compensation layer, ny is a refractive index in a fast axis of the optical compensation layer, and d(nm) is a thickness of the optical compensation layer. Typically, Δnd is measured using light having a wavelength of 590 nm. The slow axis refers to the direction providing the maximum refractive index in a plane of a film, and the fast axis refers to a direction perpendicular to a slow axis in the plane.

The thickness direction retardation Rth of the optical compensation layer 20 can also be optimized corresponding to the display or drive mode of the liquid crystal cell. For example, the lower limit of Rth is preferably 10 nm or more, more preferably 20 nm or more, and most preferably 50 nm or more. In the case where Rth is less than 10 nm, a contrast in an oblique direction decreases inmost cases. On the other hand, the upper limit of Rth is preferably 1,000 nm or less, more preferably 500 nm or less, still more preferably 400 nm or less, and particularly preferably 300 nm or less, more particularly preferably 280 nm or less, and most preferably 260 nm or less. When Rth exceeds 1,000 nm, optical compensation increases excessively, which may result in a decrease in a contrast in an oblique direction. More specifically, when the liquid crystal cell adopts a VA mode, Rth is preferably 10 to 300 nm, more preferably 20 to 280 nm, and most preferably 50 to 260 nm. When the liquid crystal cell adopts an OCB mode, Rth is preferably 10 to 1,000 nm, more preferably 20 to 500 nm, and most preferably 50 to 400 nm. Rth is obtained by an expression: Rth=(nx−nz)×d. Herein, nz is a refractive index in a thickness direction of a film (optical compensation layer). Rth is also measured typically using light having a wavelength of 590 nm.

The Nz coefficient (=Rth/Δnd) of the optical compensation layer 20 can be optimized corresponding to the display or drive mode of the liquid crystal cell. For example, the Nz coefficient is preferably 2 to 20, more preferably 2 to 10, particularly preferably 2 to 8, and most preferably 2 to 6. More specifically, when the liquid crystal cell adopts a VA mode, the Nz coefficient is preferably 2 to 10, more preferably 2 to 8, and most preferably 2 to 6. When the liquid crystal cell adopts an OCB mode, the Nz coefficient is preferably 2 to 20, more preferably 2 to 10, and most preferably 2 to 8. Further, the optical compensation layer 20 has a refractive index profile of nx>ny>nz. By placing an optical compensation layer having such optical characteristics (more specifically, Δnd, Rth, a refractive index profile, and an Nz coefficient) on a viewer side of the liquid crystal cell, and using the optical compensation layer in combination with a backlight portion that emits light having a brightness distribution in a horizontally oblong oval shape when the longitudinal direction of a panel is arranged in the horizontal direction, a liquid crystal panel having remarkably excellent contrast in an oblique direction, small light leakage in a black display and a small color shift can be obtained.

The optical compensation layer 20 may be a single layer or a laminate of at least two layers. In the case where the optical compensation layer 20 is a laminate, the material constituting each layer and the thickness of each layer can be set appropriately, as long as the above-mentioned optical characteristics are obtained in the laminate as a whole.

As the thickness of the optical compensation layer, any appropriate thickness can be adopted as long as the effects of the present invention are exhibited. Typically, the thickness of the optical compensation layer is 0.1 to 50 μm, preferably 0.5 to 30 μm, and more preferably 1 to 20 μm. This is because such a thickness can contribute to the thinning of the liquid crystal panel, and an optical compensation layer having excellent viewing angle compensating performance and having a uniform retardation can be obtained. According to the present invention, using an optical compensation layer having a thickness much smaller than that of a conventional retardation plate, and using such an optical compensation layer only on a viewer side, excellent viewing angle compensation can be realized.

C-2. Material for Constituting Optical Compensation Layer

Any suitable materials may be employed as a material constituting the optical compensation layer as long as the optical compensation layer has the above optical characteristics. An example of such a material includes a non-liquid crystalline material. The material is particularly preferably a non-liquid crystalline polymer. The non-liquid crystalline material differs from a liquid crystalline material and may form an optically uniaxial film with nx>nz or ny>nz as property of the non-liquid crystalline material itself, regardless of alignment property of the substrate. As a result, the non-liquid crystalline material may employ not only an alignment treated substrate, but also an untreated substrate in a step of forming the optical compensation layer. Further, a step of applying an alignment film on a substrate surface, a step of laminating an alignment film, or the like may be omitted even when an untreated substrate is employed.

A preferred example of the non-liquid crystalline material includes a polymer such as polyamide, polyimide, polyester, polyetherketone, polyamideimide, or polyesterimide since such a material has excellent thermal resistance, excellent chemical resistance, excellent transparency, and sufficient rigidity. One type of polymer may be used, or a mixture of two or more types thereof having different functional groups such as a mixture of polyaryletherketone and polyamide may be used. Of those, polyimide is particularly preferred in view of high transparency, high alignment property, and high stretching property.

A molecular weight of the polymer is not particularly limited. However, the polymer has a weight average molecular weight (Mw) of preferably within a range of 1,000 to 1,000,000, more preferably within a range of 2,000 to 500,000, for example.

Polyimide which has high in-plane orientation and which is soluble in an organic solvent is preferred as polyimide used in the present invention, for example. More specifically, a polymer disclosed in JP 2000-511296 A, containing a condensation polymerization product of 9,9-bis(aminoaryl)fluorene and aromatic tetracarboxylic dianhydride, and containing at least one repeating unit represented by the following formula (1) can be used.

[Chemical formula 1]

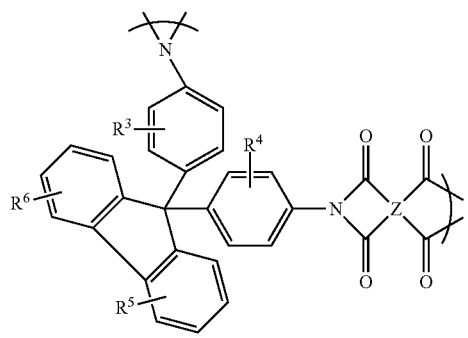

(1)

In the above formula (1), $R^3$ to $R^6$ independently represent at least one type of substituent selected from hydrogen, a halogen, a phenyl group, a phenyl group substituted with 1 to 4 halogen atoms or 1 to 4 alkyl groups each having 1 to 10 carbon atoms, and an alkyl group having 1 to 10 carbon atoms. Preferably, $R^3$ to $R^6$ independently represent at least one type of substituent selected from a halogen, a phenyl group, a phenyl group substituted with 1 to 4 halogen atoms or 1 to 4 alkyl groups each having 1 to 10 carbon atoms, and an alkyl group having 1 to 10 carbon atoms.

In the above formula (1), Z represents a tetravalent aromatic group having 6 to 20 carbon atoms, and preferably represents a pyromellitic group, a polycyclic aromatic group, a derivative of the polycyclic aromatic group, or a group represented by the following formula (2), for example.

[Chemical formula 2]

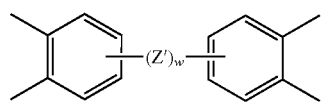

(2)

In the above formula (2), Z' represents a covalent bond, a $C(R^7)_2$ group, a CO group, an O atom, an S atom, an $SO_2$ group, an $Si(C_2H_5)_2$ group, or an $NR^8$ group. A plurality of Z's may be the same or different from each other. w represents an integer of 1 to 10. $R^7$s independently represent hydrogen or a $C(R^9)_3$ group. $R^8$ represents hydrogen, an alkyl group having 1 to about 20 carbon atoms, or an aryl group having 6 to 20 carbon atoms. A plurality of $R^8$s may be the same or different from each other. $R^9$s independently represent hydrogen, fluorine, or chlorine.

An example of the polycyclic aromatic group includes a tetravalent group derived from naphthalene, fluorene, benzofluorene, or anthracene. An example of the substituted derivative of the polycyclic aromatic group includes the above polycyclic aromatic group substituted with at least a group selected from an alkyl group having 1 to 10 carbon atoms, a fluorinated derivative thereof, and a halogen such as F or Cl.

Other examples of the polyimide include: a homopolymer disclosed in JP 08-511812 A and containing a repeating unit represented by the following general formula (3) or (4); and polyimide disclosed therein and containing a repeating unit represented by the following general formula (5). Note that, polyimide represented by the following formula (5) is a preferred form of the homopolymer represented by the following formula (3).

[Chemical formula 3]

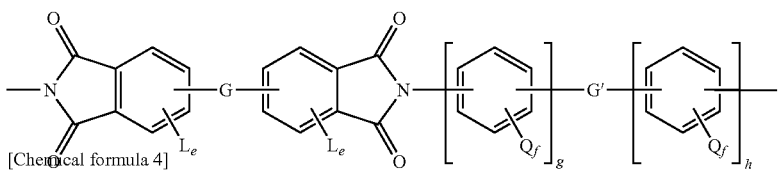

(3)

[Chemical formula 4]

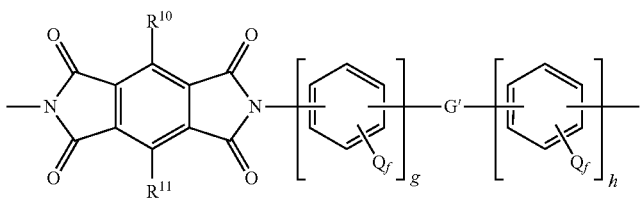

(4)

[Chemical formula 5]

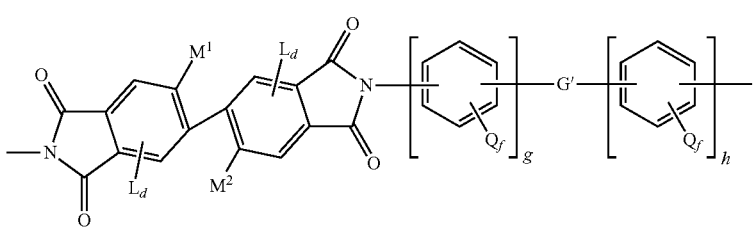

(5)

In the above general formulae (3) to (5), G and G' independently represent a covalent bond, a CH$_2$ group, a C(CH$_3$)$_2$ group, a C(CF$_3$)$_2$ group, a C(CX$_3$)$_2$ group (wherein, X represents a halogen), a CO group, an O atom, an S atom, an SO$_2$ group, an Si(CH$_2$CH$_3$)$_2$ group, or an N(CH$_3$) group, for example. G and G' may be the same or different from each other.

In the above formulae (3) and (5), L is a substituent, and d and e each represent the number of the substituents. L represents a halogen, an alkyl group having 1 to 3 carbon atoms, a halogenated alkyl group having 1 to 3 carbon atoms, a phenyl group, or a substituted phenyl group, for example. A plurality of Ls may be the same or different from each other. An example of the substituted phenyl group includes a substituted phenyl group having at least one type of substituent selected from a halogen, an alkyl group having 1 to 3 carbon atoms, and a halogenated alkyl group having 1 to 3 carbon atoms, for example. Examples of the halogen include fluorine, chlorine, bromine, and iodine. d represents an integer of 0 to 2, and e represents an integer of 0 to 3.

In the above formulae (3) to (5), Q is a substituent, and f represents the number of the substituents. Q represents an atom or a group selected from hydrogen, a halogen, an alkyl group, a substituted alkyl group, a nitro group, a cyano group, a thioalkyl group, an alkoxy group, an aryl group, a substituted aryl group, an alkyl ester group, and a substituted alkyl ester group, for example. A plurality of Qs may be the same or different from each other. Examples of the halogen include fluorine, chlorine, bromine, and iodine. An example of the substituted alkyl group includes a halogenated alkyl group. An example of the substituted aryl group includes a halogenated aryl group. f represents an integer of 0 to 4, and g represents an integer of 0 to 3. h represents an integer of 1 to 3. g and h are each preferably larger than 1.

In the above formula (4), R$^{10}$ and R$^{11}$ independently represent an atom or a group selected from hydrogen, a halogen, a phenyl group, a substituted phenyl group, an alkyl group, and a substituted alkyl group. Preferably, R$^{10}$ and R$^{11}$ independently represent a halogenated alkyl group.

In the above formula (5), M$^1$ and M$^2$ independently represent a halogen, an alkyl group having 1 to 3 carbon atoms, a halogenated alkyl group having 1 to 3 carbon atoms, a phenyl group, or a substituted phenyl group, for example. Examples of the halogen include fluorine, chlorine, bromine, and iodine. An example of the substituted phenyl group includes a substituted phenyl group having at least one type of substituent selected from the group consisting of a halogen, an alkyl group having 1 to 3 carbon atoms, and a halogenated alkyl group having 1 to 3 carbon atoms.

A specific example of the polyimide represented by the above formula (3) includes a compound represented by the following formula (6).

[Chemical formula 6]

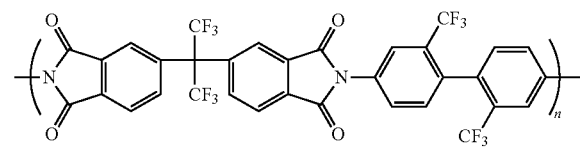

(6)

Another example of the polyimide includes a copolymer prepared through arbitrary copolymerization of acid dianhydride having a skeleton (repeating unit) other than that as described above and diamine.

An example of the acid dianhydride includes an aromatic tetracarboxylic dianhydride. Examples of the aromatic tetracarboxylic dianhydride include pyromellitic dianhydride, benzophenone tetracarboxylic dianhydride, naphthalene tetracarboxylic dianhydride, heterocyclic aromatic tetracarboxylic dianhydride, and 2,2'-substituted biphenyltetracarboxylic dianhydride.

Examples of the pyromellitic dianhydride include: pyromellitic dianhydride; 3,6-diphenyl pyromellitic dianhydride; 3,6-bis(trifluoromethyl)pyromellitic dianhydride; 3,6-dibromopyromellitic dianhydride; and 3,6-dichloropyromellitic dianhydride. Examples of the benzophenone tetracarboxylic dianhydride include: 3,3',4,4'-benzophenone tetracarboxylic dianhydride; 2,3,3',4'-benzophenone tetracarboxylic dianhydride; and 2,2',3,3'-benzophenone tetracarboxylic dianhydride. Examples of the naphthalene tetracarboxylic dianhydride include: 2,3,6,7-naphthalene tetracarboxylic dianhydride; 1,2,5,6-naphthalene tetracarboxylic dianhydride; and 2,6-dichloronaphthalene-1,4,5,8-tetracarboxylic dianhydride. Examples of the heterocyclic aromatic tetracarboxylic dianhydride include: thiophene-2,3,4,5-tetracarboxylic dianhydride; pyrazine-2,3,5,6-tetracarboxylic dianhydride; and pyridine-2,3,5,6-tetracarboxylic dianhydride. Examples of the 2,2'-substituted biphenyltetracarboxylic dianhydride include: 2,2'-dibromo-4,4',5'-biphenyltetracarboxylic dianhydride; 2,2'-dichloro-4,4',5,5'-biphenyltetracarboxylic dianhydride; and 2,2'-bis(trifluoromethyl)-4,4',5,5'-biphenyltetracarboxylic dianhydride.

Further examples of the aromatic tetracarboxylic dianhydride include: 3,3',4,4'-biphenyltetracarboxylic dianhydride; bis(2,3-dicarboxyphenyl)methane dianhydride; bis(2,5,6-trifluoro-3,4-dicarboxyphenyl)methane dianhydride; 2,2-bis(3,4-dicarboxyphenyl)-1,1,1,3,3,3-hexafluoropropane dianhydride; 4,4'-bis(3,4-dicarboxyphenyl)-2,2-diphenylpropane dianhydride; bis(3,4-dicarboxyphenyl)ether dianhydride; 4,4'-oxydiphthalic dianhydride; bis(3,4-dicarboxyphenyl)sulfonic dianhydride; 3,3',4,4'-diphenylsulfone tetracarboxylic dianhydride; 4,4'-[4,4'-isopropylidene-di(p-phenyleneoxy)]bis(phthalic anhydride); N,N-(3,4-dicarboxyphenyl)-N-methylamine dianhydride; and bis(3,4-dicarboxyphenyl)diethylsilane dianhydride.

Of those, the aromatic tetracarboxylic dianhydride is preferably 2,2'-substituted biphenyltetracarboxylic dianhydride, more preferably 2,2'-bis(trihalomethyl)-4,4',5,5'-biphenyltetracarboxylic dianhydride, and furthermore preferably 2,2'-bis(trifluoromethyl)-4,4',5,5'-biphenyltetracarboxylic dianhydride.

An example of the diamine includes aromatic diamine. Specific examples of the aromatic diamine include benzenediamine, diaminobenzophenone, naphthalenediamine, heterocyclic aromatic diamine, and other aromatic diamines.

Examples of the benzenediamine include benzenediamines such as o-, m-, or p-phenylenediamine, 2,4-diaminotoluene, 1,4-diamino-2-methoxybenzene, 1,4-diamino-2-phenylbenzene, and 1,3-diamino-4-chlorobenzene. Examples of the diaminobenzophenone include 2,2'-diaminobenzophenone and 3,3'-diaminobenzophenone. Examples of the naphthalenediamine include 1,8-diaminonaphthalene and 1,5-diaminonaphthalene. Examples of the heterocyclic aromatic diamine include 2,6-diaminopyridine, 2,4-diaminopyridine, and 2,4-diamino-5-triazine.

Further examples of the aromatic diamine include: 4,4'-diaminobiphenyl; 4,4'-diaminodiphenylmethane; 4,4'-(9-fluorenylidene)-dianiline; 2,2'-bis(trifluoromethyl)-4,4'-diaminobiphenyl; 3,3'-dichloro-4,4'-diaminodiphenylmethane; 2,2'-dichloro-4,4'-diaminobiphenyl; 2,2',5,5'-tetrachlorobenzidine; 2,2-bis(4- aminophenoxyphenyl)propane; 2,2-bis(4-aminophenyl) propane; 2,2-bis(4-aminophenyl)-1,1,1,3,3,3-hexafluoropropane; 4,4'-diaminodiphenyl ether; 3,4'-diaminodiphenyl ether; 1,3-bis(3-aminophenoxy)benzene; 1,3-bis(4-aminophenoxy)benzene; 1,4-bis(4-aminophenoxy)benzene; 4,4'-bis(4-aminophenoxy)biphenyl; 4,4'-bis(3-aminophenoxy)biphenyl; 2,2-bis[4-(4-aminophenoxy)phenyl]propane; 2,2-bis[4-(4-aminophenoxy)phenyl]-1,1,1,3,3,3-hexafluoropropane; 4,4'-diaminodiphenyl thioether; and 4,4'-diaminodiphenylsulfone.

An example of the polyetherketone includes polyaryletherketone disclosed in JP 2001-049110 A and represented by the following general formula (7).

[Chemical formula 7]

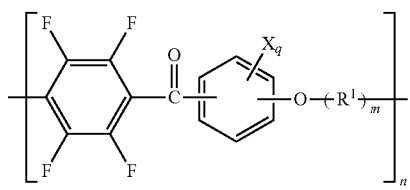

(7)

In the above formula (7), X represents a substituent, and q represents the number of the substituents. X represents a halogen atom, a lower alkyl group, a halogenated alkyl group, a lower alkoxy group, or a halogenated alkoxy group, for example. A plurality of Xs may be the same or different from each other.

Examples of the halogen atom include a fluorine atom, a bromine atom, a chlorine atom, and an iodine atom. Of those, a fluorine atom is preferred. The lower alkyl group is preferably an alkyl group having a straight chain or branched chain of 1 to 6 carbon atoms, more preferably an alkyl group having a straight chain or branched chain of 1 to 4 carbon atoms. More specifically, the lower alkyl group is preferably a methyl group, an ethyl group, a propyl group, an isopropyl group, a butyl group, an isobutyl group, a sec-butyl group, or a tert-butyl group, and particularly preferably a methyl group or an ethyl group. An example of the halogenated alkyl group includes a halide of the above lower alkyl group such as a trifluoromethyl group. The lower alkoxy group is preferably an alkoxy group having a straight chain or branched chain of 1 to 6 carbon atoms, more preferably an alkoxy group having a straight chain or branched chain of 1 to 4 carbon atoms. More specifically, the lower alkoxy group is preferably a methoxy group, an ethoxy group, a propoxy group, an isopropoxy group, a butoxy group, an isobutoxy group, a sec-butoxy group, or a tert-butoxy group, and particularly preferably a methoxy group or an ethoxy group. An example of the halogenated alkoxy group includes a halide of the above lower alkoxy group such as a trifluoromethoxy group.

In the above formula (7), q is an integer of 0 to 4. In the above formula (7), preferably, q=0, and a carbonyl group and an oxygen atom of ether bonded to both ends of a benzene ring are located in para positions.

In the above formula (7), $R^1$ is a group represented by the following formula (8), and m is an integer of 0 or 1.

[Chemical formula 8]

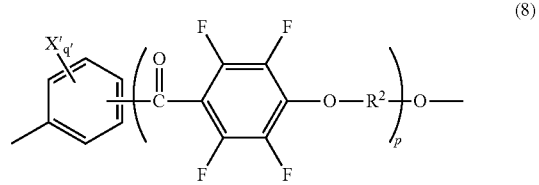

(8)

In the above formula (8), X' represents a substituent which is the same as X in the above formula (7), for example. In the above formula (a), a plurality of X's may be the same or different from each other. q' represents the number of the substituents X'. q' is an integer of 0 to 4, and q' is preferably 0. p is an integer of 0 or 1.

In the above formula (8), $R^2$ represents a divalent aromatic group. Examples of the divalent aromatic group include: an o-, m-, or p-phenylene group; and a divalent group derived from naphthalene, biphenyl, anthracene, o-, m-, or p-terphenyl, phenanthrene, dibenzofuran, biphenyl ether, or biphenyl sulfone. In the divalent aromatic group, hydrogen directly bonded to an aromatic group may be substituted with a halogen atom, a lower alkyl group, or a lower alkoxy group. Of those, $R^2$ is preferably an aromatic group selected from groups represented by the following formulae (9) to (15).

[Chemical formula 9]

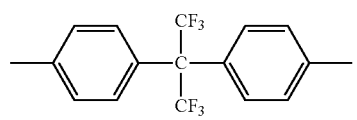

(9)

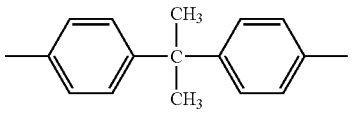

(10)

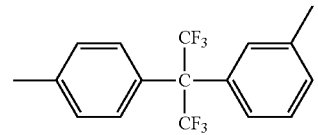

(11)

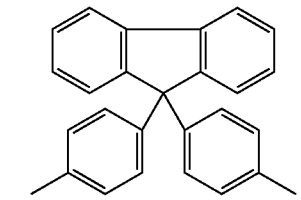

(12)

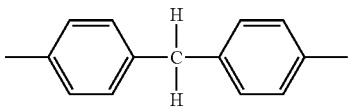

(13)

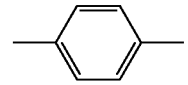

(14)

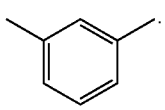
(16)

In the above formula (7), R¹ is preferably a group represented by the following formula (16). In the following formula (16), R² and p are defined as those in the above formula (8).

[Chemical formula 10]

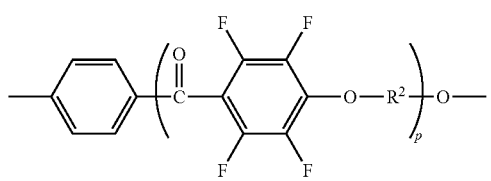
(16)

In the above formula (7), n represents a degree of polymerization. n falls within a range of 2 to 5,000, preferably within a range of 5 to 500, for example. Polymerization may involve polymerization of repeating units of the same structure or polymerization of repeating units of different structures. In the latter case, a polymerization form of the repeating units may be block polymerization or random polymerization.

Terminals of the polyaryletherketone represented by the above formula (7) are preferably a fluorine atom on a p-tetrafluorobenzoylene group side and a hydrogen atom on an oxyalkylene group side. Such polyaryletherketone can be represented by the following general formula (17), for example. In the following formula (17), n represents the same degree of polymerization as that in the above formula (7).

[Chemical formula 11]

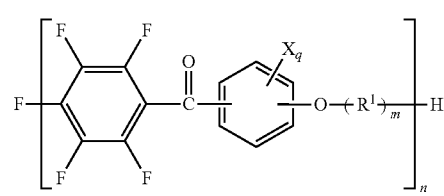
(17)

Specific examples of the polyaryletherketone represented by the above formula (7) include compounds represented by the following formulae (18) to (21). In each of the following formulae, n represents the same degree of polymerization as that in the above formula (7).

[Chemical formula 12]

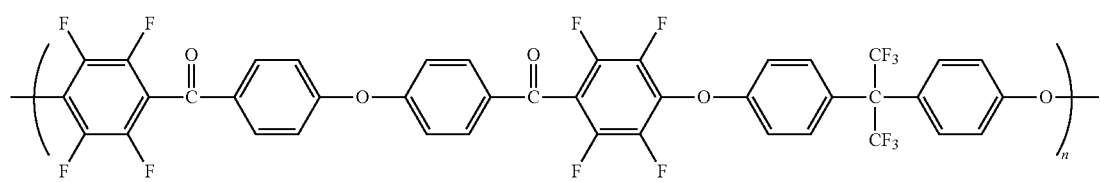
(18)

[Chemical formula 13]

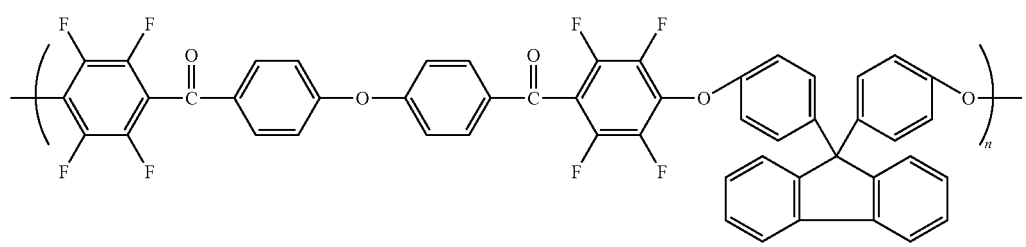
(19)

[Chemical formula 14]

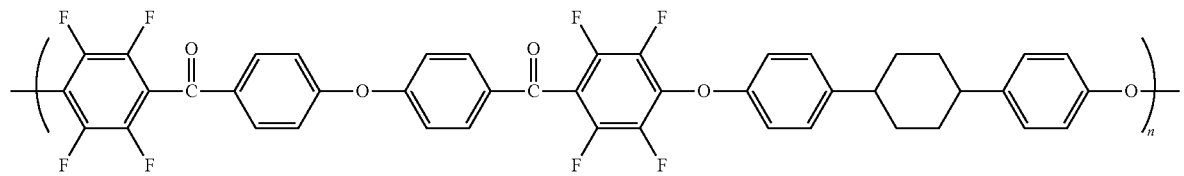
(20)

[Chemical formula 15]

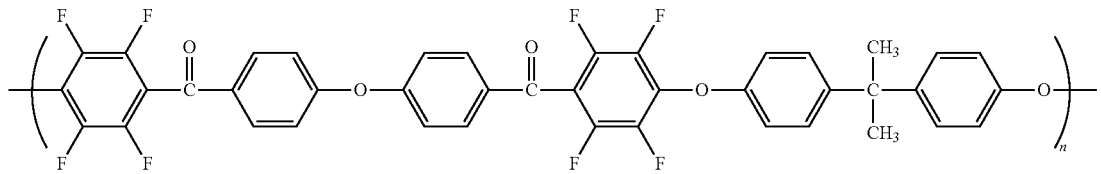

(21)

In addition, an example of polyamide or polyester includes polyamide or polyester disclosed in JP 10-508048 A. A repeating unit thereof can be represented by the following general formula (22), for example.

[Chemical formula 16]

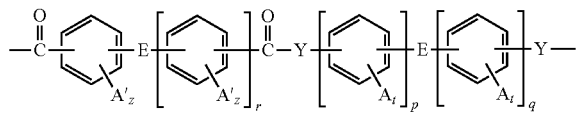

(22)

In the above formula (22), Y represents O or NH. E represents at least one selected from a covalent bond, an alkylene group having 2 carbon atoms, a halogenated alkylene group having 2 carbon atoms, a $CH_2$ group, a $C(CX_3)_2$ group (wherein, X is a halogen or hydrogen), a CO group, an O atom, an S atom, an $SO_2$ group, an group, and an N(R) group, for example. A plurality of Es may be the same or different from each other. In E, R is at least one of an alkyl group having 1 to 3 carbon atoms and a halogenated alkyl group having 1 to 3 carbon atoms, and is located in a meta or para position with respect to a carbonyl functional group or a Y group.

In the above formula (22), A and A' each represent a substituent, and t and z represent the numbers of the respective substituents. p represents an integer of 0 to 3, and q represents an integer of 1 to 3. r represents an integer of 0 to 3.

A is selected from hydrogen, a halogen, an alkyl group having 1 to 3 carbon atoms, a halogenated alkyl group having 1 to 3 carbon atoms, an alkoxy group represented by OR (wherein, R is defined as above), an aryl group, a substituted aryl group prepared through halogenation or the like, an alkoxycarbonyl group having 1 to 9 carbon atoms, an alkylcarbonyloxy group having 1 to 9 carbon atoms, an aryloxycarbonyl group having 1 to 12 carbon atoms, an arylcarbonyloxy group having 1 to 12 carbon atoms and its substituted derivatives, an arylcarbamoyl group having 1 to 12 carbon atoms, and arylcarbonylamino group having 1 to 12 carbon atoms and its substituted derivatives, for example. A plurality of As may be the same or different from each other. A' is selected from a halogen, an alkyl group having 1 to 3 carbon atoms, a halogenated alkyl group having 1 to 3 carbon atoms, a phenyl group, and a substituted phenyl group, for example. A plurality of A's may be the same or different from each other. Examples of the substituent on a phenyl ring of the substituted phenyl group include a halogen, an alkyl group having 1 to 3 carbon atoms, a halogenated alkyl group having 1 to 3 carbon atoms, and the combination thereof. t represents an integer of 0 to 4, and z represents an integer of 0 to 3.

The repeating unit of the polyamide or polyester represented by the above formula (22) is preferably a repeating unit represented by the following general formula (23).

[Chemical formula 17]

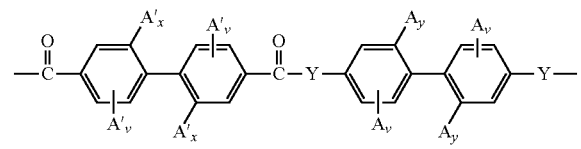

(23)

In the above formula (23), A, A', and Y are defined as those in the above formula (22). v represents an integer of 0 to 3, preferably an integer of 0 to 2. x and y are each 0 or 1, but are not both 0.

C-3. Method of Forming Optical Compensation Layer

Next, a method of forming the optical compensation layer will be described. Any suitable methods may be employed as the method of forming the optical compensation layer as long as an optical compensation layer having the above optical characteristics can be obtained. The production method generally includes the steps of: applying a solution of the non-liquid crystalline polymer on a substrate film; and forming a layer of the non-liquid crystalline polymer by removing a solvent in the solution. Typically, a laminate in which the optical compensation layer is formed on the substrate is attached to the polarizer via any appropriate pressure-sensitive adhesive such that the surface of the laminate on which the optical compensation layer is not formed faces the polarizer. As a result, the substrate functions as a protective layer of the polarizer.

Any suitable films may be employed as the substrate film. A typical example of the substrate film includes a plastic film used for the protective layer of the polarizer described below in the section E.

The solvent of the application solution is not particularly limited. Examples of the solvent include: halogenated hydrocarbons such as chloroform, dichloromethane, carbon tetrachloride, dichloroethane, tetrachloroethane, trichloroethylene, tetrachloroethylene, chlorobenzene, and orthodichlorobenzene; phenols such as phenol and parachlorophenol; aromatic hydrocarbons such as benzene, toluene, xylene, methoxybenzene, and 1,2-dimethoxybenzene; ketone-based solvents such as acetone, methyl ethyl ketone, methyl isobutyl ketone, cyclohexanone, cyclopentanone, 2-pyrrolidone, and N-methyl-2-pyrrolidone; ester-based solvents such as ethyl acetate and butyl acetate; alcohol-based solvents such as t-butyl alcohol, glycerin, ethylene glycol, triethylene glycol, ethylene glycol monomethyl ether, diethylene glycoldimethyl ether, propylene glycol, dipropylene glycol, and 2-methyl-2,4-pentanediol; amide-based solvents such as dimethylformamide and dimethylacetamide; nitrile-based solvents such as acetonitrile and butyronitrole; ether-based solvents such as diethyl ether, dibutyl ether, and tetrahydrofuran; and carbon disulfide, ethyl cellosolve, and butyl cellosolve. Of those, methyl isobutyl ketone is preferred because it has high solubility to non-liquid crystalline materials and does not corrode the substrate. The solvent may be used alone or in combination of two or more types thereof.

Any suitable concentrations of the non-liquid crystalline polymer in the application liquid may be employed as long as the above optical compensation layer can be obtained and the solution can be applied on the substrate film. For example, the solution contains preferably 5 to 50 parts by weight, more preferably 10 to 40 parts by weight of the non-liquid crystalline polymer with respect to 100 parts by weight of the solvent. The solution having a concentration within the above range has a viscosity that facilitates application thereof.

The application solution may further contain various additives such as stabilizers, plasticizers, and metals as required.

The application solution may further contain other resin as required. Examples of the other resin include various general-purpose resins, engineering plastics, thermoplastic resins, and thermosetting resins. The use of such resins allows formation of an optical compensation layer having appropriate mechanical strength or durability depending on the purpose.

Examples of the general-purpose resins include polyethylene (PE), polypropylene (PP), polystyrene (PS), polymethyl methacrylate (PMMA), an ABS resin, and an AS resin. Examples of the engineering plastics include polyacetate (POM), polycarbonate (PC), polyamide (PA: nylon), polyethylene terephthalate (PET), and polybutylene terephthalate (PBT). Examples of the thermoplastic resins include polyphenylene sulfide (PPS), polyether sulfone (PES), polyketone (PK), polyimide (PI), polycyclohexanedimethanol terephthalate (PCT), polyarylate (PAR), and a liquid crystal polymer (LCP). Examples of the thermosetting resins include an epoxy resin and a phenol novolac resin.

The type and amount of the other resin added to the application solution may be set appropriately depending on the purpose. The resin is added in a ratio of preferably 0 to 50 wt %, more preferably 0 to 30 wt % with respect to the non-liquid crystalline polymer, for example.

Examples of a method of applying the solution include spin coating, roll coating, flow coating, printing, dip coating, flow casting, bar coating, and gravure coating. For application, lamination of a polymer layer may also be used as required.

After the application, the solvent in the solution is removed through evaporation by natural drying, air drying, or drying under heating (at 60 to 250° C., for example), to thereby form an optical compensation layer in a form of film.

In the production method, treatment for imparting optically biaxial characteristics (nx>ny>nz) is preferably carried out. Such treatment can assuredly provide an in-plane difference in refractive index (nx>ny), to thereby obtain an optical compensation layer having optically biaxial characteristics (nx>ny>nz). That is, an optical compensation layer having the optical characteristics described in the above section C-1 can be obtained. In other words, an optical compensation layer having optically uniaxial characteristics (nx=ny>nz) might be obtained without such treatment. Examples of a method of imparting an in-plane difference in refractive index include the following two methods. A first method involves: applying the solution on a transparent polymer film subjected to stretching treatment; and drying the film. According to the first method, optically biaxial characteristics may be attained through shrinkage of the transparent polymer film. A second method involves: applying the solution on an unstretched transparent polymer film; drying the whole; and stretching the whole under heating. According to the second method, optically biaxial characteristics may be attained through stretching of the transparent polymer film and the applied layer thereon. An example of the polymer film used for the methods includes the plastic film used for the transparent protective layer (section E).

D. Polarizer

Any suitable polarizers may be employed as the first and second polarizers 30 and 30' depending on the purpose. Examples of the polarizer include: a film prepared by adsorbing a dichromatic substance such as iodine or a dichromatic dye on a hydrophilic polymer film such as a polyvinyl alcohol-based film, a partially formalized polyvinyl alcohol-based film, or an ethylene/vinyl acetate copolymer-based partially saponified film and uniaxially stretching the film; and a polyene-based orientated film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferred in view of high polarized dichromaticity. A thickness of the polarizer is not particularly limited, but is generally about 5 to 80 μm. The first and second polarizers 30 and 30' may be identical to or different from each other.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required. Washing the polyvinyl alcohol-based film with water not only allows removal of contamination on a film surface or washing away of an antiblocking agent, but also prevents nonuniformity such as uneven coloring or the like by swelling the polyvinyl alcohol-based film. The stretching of the film may be carried out after coloring of the film with iodine, carried out during coloring of the film, or carried out followed by coloring of the film with iodine. The stretching may be carried out in an aqueous solution of boric acid or potassium iodide, or in a water bath.

E. Transparent Protective Layer

Practically, the transparent protective layer is provided on the outer side of each of the first and second polarizers 30 and 30'. Further, another transparent protective layer may be provided on the liquid crystal cell side of the first polarizer 30 and/or on the optical compensation layer side of the second polarizer 30', as required.

Any suitable protective layers may be employed as the transparent protective layer depending on the purpose. The transparent protective layer is composed of a plastic film having excellent transparency, mechanical strength, thermal stability, water shielding property, isotropy, and the like, for example. Specific examples of a resin constituting the plastic film include an acetate resin such as triacetylcellulose (TAC), a polyester resin, a polyether sulfone resin, a polysulfone resin, a polycarbonate resin, a polyamide resin, a polyimide resin, a polyolefin resin, an acrylic resin, a polynorbornene resin, a cellulose resin, a polyallylate resin, a polystyrene resin, a polyvinyl alcohol resin, and a mixture thereof. A further example thereof includes an acrylic, urethane-based, acrylic urethane-based, epoxy-based, or silicone-based thermosetting resin or UV-curable resin. Of those, a TAC film subjected to surface saponization treatment with alkali or the like is preferred in view of polarization characteristics and durability.

Further, a polymer film formed from a resin composition described in JP 2001-343529 A (WO 01/37007) may be used as a transparent protective layer, for example. More specifically, the film is formed from a mixture of a thermoplastic resin having a substituted imide group or unsubstituted imide group on a side chain, and a thermoplastic resin having a substituted phenyl group or unsubstituted phenyl group and a cyano group on a side chain. A specific example thereof includes a resin composition containing an alternate copolymer of isobutene and N-methylene maleimide, and an acrylonitrile/styrene copolymer. An extruded product of such a resin composition may be used, for example.

The transparent protective layer is by definition transparent and preferably has no color. More specifically, the transparent protective layer has a thickness direction retardation Rth of preferably −90 nm to +75 nm, more preferably −80 nm to +60 nm, most preferably −70 nm to +45 nm. A thickness direction retardation Rth of the transparent protective layer falling within the above range may eliminate optical coloring of the polarizer attributed to the protective layer.

A thickness of the protective layer may be appropriately set depending on the purpose. A thickness of the protective layer is generally 500 μm or less, preferably 5 to 300 μm, more preferably 5 to 150 μm.

Hereinafter, the present invention will be described in more detail by way of examples, but the present invention is not limited to the examples. Methods of measuring characteristics in the examples are as described below.

(1) Measurement of Retardation

Refractive indices nx, ny, and nz of a sample film were measured using an automatic birefringence analyzer (Automatic birefringence analyzer KOBRA-21ADH, manufactured by Oji Scientific Instruments), and an in-plane retardation Δnd, and a thickness direction retardation Rth were calculated. A measurement temperature was 23° C. and a measurement wavelength was 590 nm.

(2) Measurement of Color Shift

A color tone of a liquid crystal display apparatus was measured by changing a polar angle in a range of 0° to 80°, using "EZ Contrast 160D" (tradename) manufactured by ELDIM Corporation, and plotted on an XY chromaticity diagram. The azimuth angle was set to be 0°, 30°, 45°, 60°, and 90° in Example 1 and Comparative Example 1, and 45° in Example 2 and Comparative Example 2.

(3) Measurement of Light Leakage

A black image was displayed on a produced liquid crystal display apparatus, and light leakage was measured by changing a polar angle in a range of −70° to 70° using "EZ Contrast160D" (tradename) manufactured by ELDIM Corporation.

(4) Measurement of Brightness

The brightness was measured by changing a polar angle in a range of 0° to 90° in an omnidirection using "EZ Contrast160D" (tradename) manufactured by ELDIM Corporation.

Reference Example 1

Formation of Optical Compensation Layer

Polyimide represented by the below-indicated formula (6), synthesized from 2,2-bis(3,4-dicarboxyphenyl)hexafluoropropane dianhydride (6FDA) and 2,2'-bis(trifluoromethyl)-4,4'-diaminobiphenyl (TFMB), and having a weight average molecular weight (Mw) of 70,000 was dissolved in methyl isobutyl ketone, to thereby prepare a 15 wt % polyimide solution. Preparation of polyimide or the like was carried out by referring to a method described in a document (F. Li et al., Polymer 40 (1999) 4571-4583). Meanwhile, a triacetylcellulose (TAC) film having a thickness of 80 μm was stretched in a width direction 1.3 times at 175° C. through fixed end stretching, to thereby produce a stretched TAC film having a thickness of 75 μm as a substrate film. The polyimide solution was applied onto the substrate film to be dried at 100° C. for 10 minutes. As a result, an optical film A having an optical compensation layer on the substrate film was obtained. The optical compensation layer had a thickness of 6 μm and a Δn (=nx−nz) of about 0.04. The optical compensation layer had a thickness direction retardation of 245 nm and an in-plane retardation of 55 nm. The optical compensation layer had optical characteristics of nx>ny>nz. The substrate film (stretched TAC film) had a Δn of about 0.0006.

[Chemical formula 18]

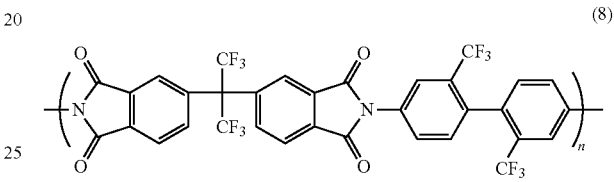

(8)

Reference Example 2

Lamination of Optical Compensation Layer and Second Polarizer

A polyvinyl alcohol film was colored in an aqueous solution containing iodine and then uniaxially stretched 6 times between rolls of different speed ratios in an aqueous solution containing boric acid, to thereby obtain a polarizer. The obtained polarizer was laminated on a surface of the substrate film of the optical film A on which the optical compensation layer is not formed. The polarizer was laminated such that a fast axis of the optical compensation layer and an absorption axis of the polarizer were substantially parallel to each other. Then, a commercially available TAC film (trade name "UZ-TAC", available from Fuji Photo Film Co., Ltd.) having a thickness of 40 μm as a protective layer was laminated on a surface of the polarizer on which the optical film A is not laminated, to thereby obtain a laminate (a polarizing plate having an optical compensation layer) B.

Example 1

Figure 9A:
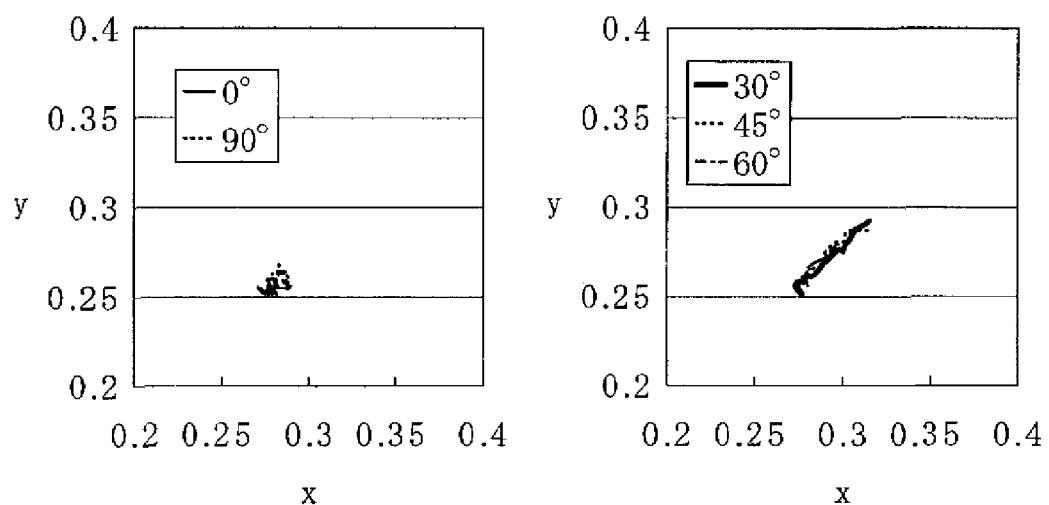
FIG. 9 Part (a) includes chromaticity diagrams showing color shifts of a liquid crystal panel according to an example of the present invention, and part (b) includes chromaticity diagrams showing color shifts of a liquid crystal panel of a comparative example.
Figure 10:
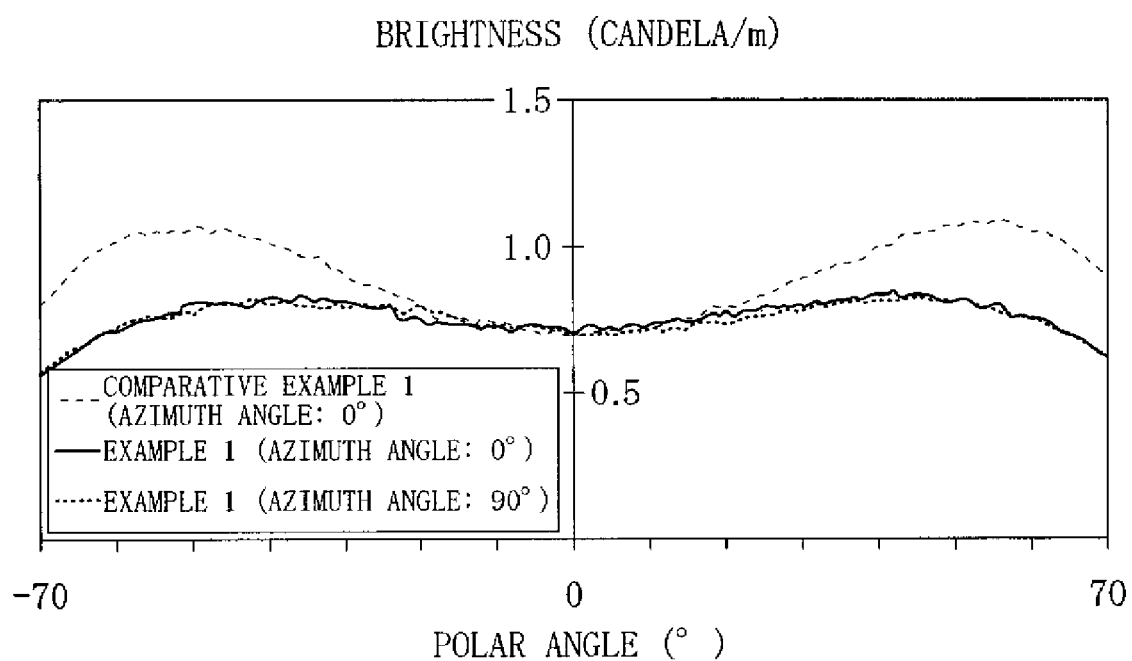
FIG. 10 A graph showing a comparison of amounts of light leakage between the liquid crystal panel according to the example of the present invention and the liquid crystal panel of the comparative example.

A liquid crystal cell was removed from a 26-inch liquid crystal TV (with a Patterned-VA liquid crystal panel manufactured by Samsung Japan Corporation mounted thereon) manufactured by Sony Corporation, and a laminate B was attached on the viewer side of the liquid crystal cell via an acrylic pressure-sensitive adhesive (thickness: 20 μm). At this time, the laminate B was attached so that the TAC protective layer was placed outer side (viewer side). On the backlight side of the liquid crystal cell, a polarizing plate having a configuration of a TAC protective layer/a polarizer/a TAC protective layer ("HEG1425DU" (tradename) manufactured by Nitto Denko Corporation) was attached via an acrylic pressure-sensitive adhesive (thickness: 20 μm) to produce a liquid crystal panel. As a backlight, the one mounted on the above-mentioned liquid crystal panel was used. This backlight had a brightness distribution as shown in FIG. 6. The brightness distribution of FIG. 6 is that measured on the viewer side in the configuration of FIG. 1. A liquid crystal display apparatus was produced using the liquid crystal panel, and a color shift and light leakage were measured. The measurement results of the color shift are shown in FIG. 9(a). The measurement results of light leakage are shown in FIG. 10 together with the results of Comparative Example 1 described later.

Comparative Example 1

Figure 9B:
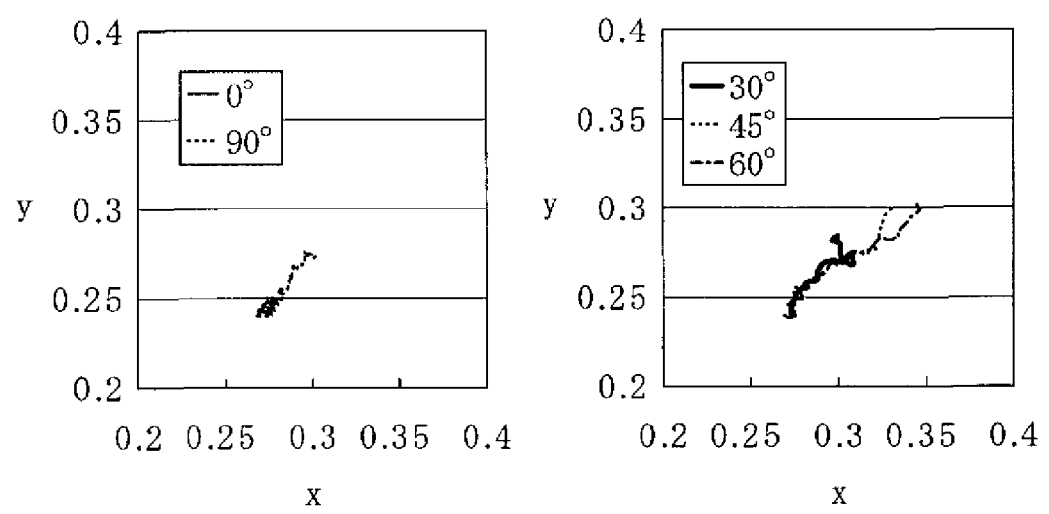

A liquid crystal display apparatus was produced in the same way as in Example 1, except that the laminate B was placed on the backlight side, and the polarizing plate having a configuration of a TAC protective layer/a polarizer/a TAC protective layer was placed on the viewer side. The obtained liquid crystal display apparatus was evaluated in the same way as in Example 1. The measurement results of a color shift are shown in FIG. 9(b), and the measurement results of light leakage are shown in FIG. 10.

Example 2

Figure 11A:
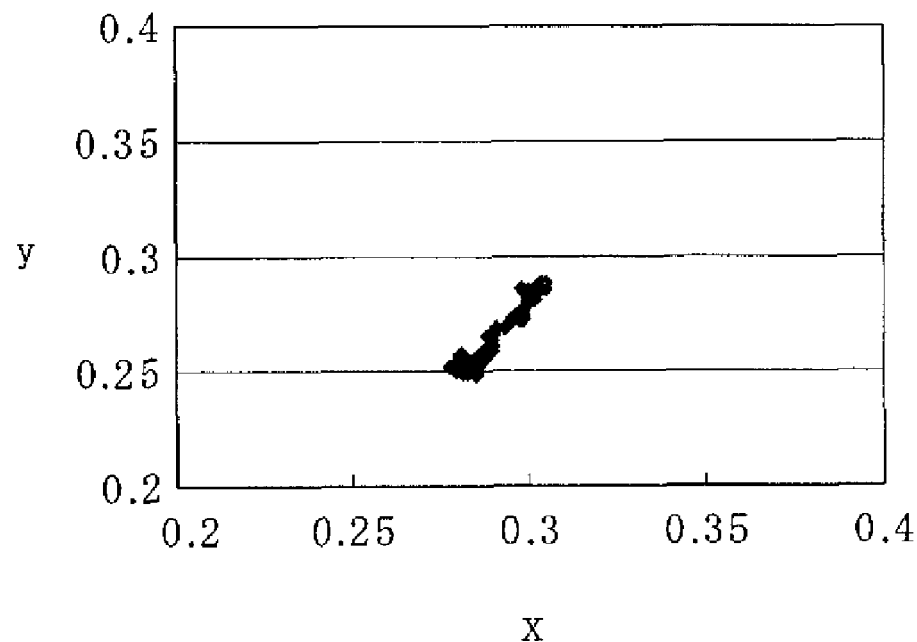
FIG. 11 Part (a) is a chromaticity diagram showing a color shift of the liquid crystal panel according to the example of the present invention, and part (b) is a chromaticity diagram showing a color shift of the liquid crystal panel of the comparative example.

A liquid crystal display apparatus was produced in the same way as in Example 1, except that a 32-inch liquid crystal television (with a liquid crystal panel manufactured by AUO mounted thereon) manufactured by BENQ Corporation was used. The backlight of the liquid crystal panel used in this example had a brightness distribution as shown in FIG. 7. The brightness distribution of FIG. 7 is that measured on the viewer side in the configuration of FIG. 1. The color shift of the obtained liquid crystal display apparatus was measured. The measurement results are shown in FIG. 11(a).

Comparative Example 2

Figure 11B:
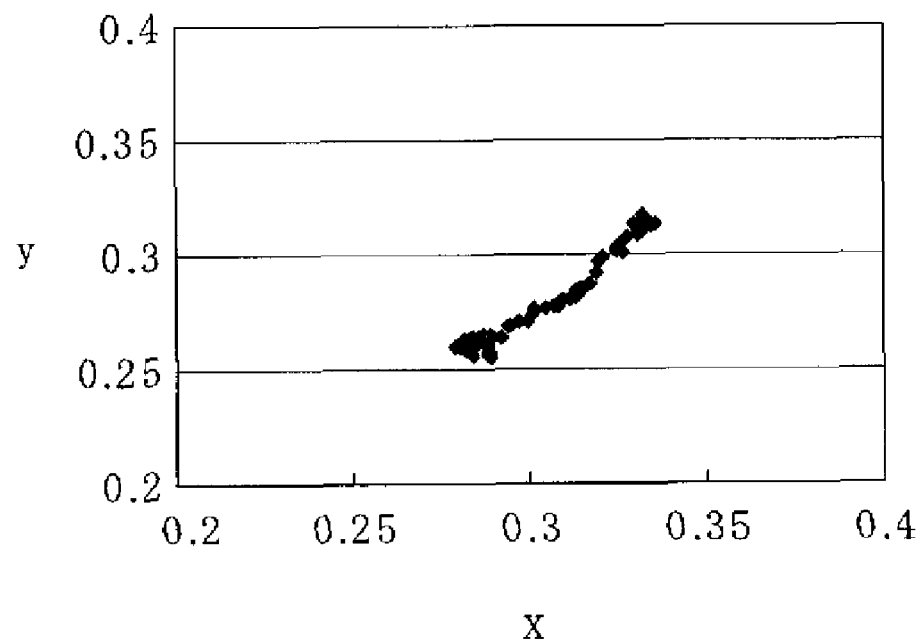
Figure 12A:
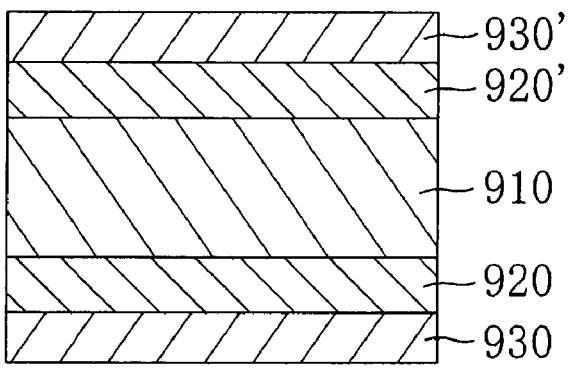
FIG. 12 Part (a) is a schematic cross-sectional view of a conventional typical liquid crystal display apparatus, and part (b) is a schematic cross-sectional view of a liquid crystal cell used in the liquid crystal display apparatus.
Figure 12B:
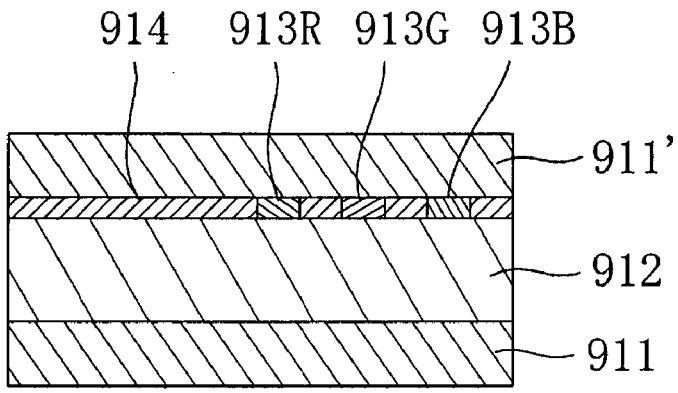

A liquid crystal display apparatus was produced in the same way as in Example 2, except that the laminate B was placed on the backlight side, and the polarizing plate having a configuration of a TAC protective layer/a polarizer/a TAC protective layer was placed on the viewer side. A color shift of the obtained liquid crystal display apparatus was evaluated in the same way as in Example 1. The measurement results of the color shift are shown in FIG. 11(b).

As is apparent from FIGS. 9(a) and 9(b) and 11(a) and 11(b), the liquid crystal panel of the present invention has a remarkably small color shift, compared with the liquid crystal panel in the comparative example. Further, as is apparent from FIG. 10, the liquid crystal panel of the present invention has remarkably small light leakage in an oblique direction, compared with the liquid crystal panel in the comparative example.

Further, as is apparent from Reference Example 1, the optical compensation layer used in the present invention has a thickness much smaller than that of the conventional retardation plate (e.g., thickness of 140 μm). Further, as is apparent from the examples, extremely excellent viewing angle compensation is realized, using only one optical compensation layer described above. Thus, it is understood that the optical compensation layer can contribute largely to thinning of a liquid crystal panel.

Industrial Applicability

The liquid crystal panel of the present invention can be applied preferably to a liquid crystal television, a mobile telephone, or the like.

The invention claimed is:
1. A liquid crystal panel, comprising:
a backlight portion emitting light having a brightness distribution in a horizontally oblong oval shape assuming that a longitudinal direction of a panel is a horizontal direction;
a first polarizer;
a liquid crystal cell;
an optical compensation layer having a refractive index profile of nx>ny>nz; and
a second polarizer, in this order from a backlight side; wherein
the brightness distribution in the horizontally oblong oval shape refers to a brightness distribution in which a polar angle X in the horizontal direction (0°-180° direction) displaying a brightness of a predetermined value or more in an omnidirectional brightness contour map is larger than a polar angle Y in a perpendicular direction (90°-270° direction) displaying a brightness of the predetermined value or more;
wherein the brightness distribution is maintained throughout the entire liquid crystal panel; and
wherein the liquid crystal cell adopts as a drive mode one of a VA mode and an OCB mode.
2. A liquid crystal panel according to claim 1, wherein the optical compensation layer has a Nz coefficient of 2<Nz<20.
3. A liquid crystal panel according to claim 1, wherein the optical compensation layer is composed of a non-liquid crystalline polymer material including at least one selected from the group consisting of polyamide, polyimide, polyester, polyetherketone, polyamideimide, and polyesterimide.
4. A liquid crystal panel according claim 1, wherein a fast axis of the optical compensation layer and an absorption axis of the second polarizer are parallel to each other.
5. A liquid crystal panel according to claim 1, wherein the optical compensation layer has a thickness of 1 to 20 μm.
6. A liquid crystal display apparatus, comprising the liquid crystal panel according to claim 1.
7. A liquid crystal panel according to claim 1, wherein the liquid crystal cell adopts as a drive mode an OCB mode.

* * * * *